(12) United States Patent
Vidyadhara et al.

(10) Patent No.: US 10,795,769 B2
(45) Date of Patent: Oct. 6, 2020

(54) FACILITATING THE IDENTIFICATION OF A SERVICE OPERATING SYSTEM WHEN A MAIN OPERATING SYSTEM FAILS

(71) Applicant: Dell Products L.P., Round Rock, TX (US)

(72) Inventors: Sumanth Vidyadhara, Bangalore (IN); Sudharshana Madhava Rao, Bangalore (IN); Anand Prakash Joshi, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 151 days.

(21) Appl. No.: 16/267,268

(22) Filed: Feb. 4, 2019

(65) Prior Publication Data

US 2020/0250038 A1  Aug. 6, 2020

(51) Int. Cl.
*G06F 11/14*  (2006.01)
*G06F 9/4401*  (2018.01)

(52) U.S. Cl.
CPC ......... *G06F 11/1417* (2013.01); *G06F 9/441* (2013.01)

(58) Field of Classification Search
CPC ............ G06F 11/0748; G06F 11/0793; G06F 11/1417; G06F 11/2294; G06F 9/4401; G06F 9/4406; G06F 9/441; G06F 9/4416
See application file for complete search history.

(56) References Cited

U.S. PATENT DOCUMENTS

| | | | | |
|---|---|---|---|---|
| 6,378,086 | B1* | 4/2002 | Crowley | G06F 11/1417 714/6.32 |
| 6,948,099 | B1* | 9/2005 | Tallam | G06F 11/1417 714/3 |
| 7,089,449 | B1* | 8/2006 | Cluff | G06F 11/1417 714/15 |
| 7,487,343 | B1* | 2/2009 | Insley | G06F 9/441 713/1 |
| 9,529,602 | B1* | 12/2016 | Swierk | G06F 9/441 |
| 2003/0074549 | A1* | 4/2003 | Paul | G06F 9/4416 713/2 |
| 2006/0020848 | A1* | 1/2006 | Maity | G06F 9/4416 714/6.31 |
| 2006/0145133 | A1* | 7/2006 | Komarla | H04L 67/34 257/1 |

(Continued)

*Primary Examiner* — Gabriel Chu
(74) *Attorney, Agent, or Firm* — Kirton McConkie; Brian Tucker

(57) ABSTRACT

The identification and loading of an appropriate service operating system can be facilitated when a main operating system fails. To facilitate the identification of which main operating system failed, an agent can create a UEFI variable that is specific to each main operating system on a client. These OS-specific UEFI variables can be employed to identify which main operating system has failed to boot. When a main operating system fails to boot, a UEFI preboot application can be configured to access the UEFI variables to identify which main operating system has failed. The UEFI preboot application can also obtain characteristics of the failed operating system from the UEFI variable and include such characteristics in a vendor extension of an SLP request. A server can employ the characteristics defined in the vendor extension to identify and send an appropriate service operating system to the client.

20 Claims, 11 Drawing Sheets

(56) References Cited

U.S. PATENT DOCUMENTS

| | | | | |
|---|---|---|---|---|
| 2009/0034543 A1* | 2/2009 | Thomas | ............ | G06F 11/1415 370/401 |
| 2012/0124419 A1* | 5/2012 | Matthew | ............ | G06F 11/1415 714/20 |
| 2015/0149412 A1* | 5/2015 | Kobres | ............ | G06F 11/1451 707/640 |
| 2016/0306688 A1* | 10/2016 | Boyapalle | ............ | G06F 11/0748 |
| 2016/0364297 A1* | 12/2016 | Lo | ............ | G06F 9/441 |

* cited by examiner

FACILITATING THE IDENTIFICATION OF A SERVICE OPERATING SYSTEM WHEN A MAIN OPERATING SYSTEM FAILS

CROSS-REFERENCE TO RELATED APPLICATIONS

N/A

BACKGROUND

The Unified Extensible Firmware Interface (UEFI) functions as an interface between the operating system and the platform firmware. A primary feature of UEFI is the provision of a standard environment for booting an operating system. UEFI consists primarily of a system partition, boot services, runtime services and table-based interfaces.

When a computing device is powered on, the platform firmware, via a boot manager, is able to retrieve an operating system loader image from the system partition which may exist on a variety of mass storage device types. Once started, the operating system loader, which is a type of UEFI application, continues to boot the complete operating system. To do so, it may use the UEFI boot services and interfaces to survey, comprehend, and initialize the various platform components and the operating system software that manages them. UEFI runtime services are also available to the operating system loader during the boot phase.

In addition to loading the operating system loader, the boot manager also allows other types of UEFI applications and UEFI drivers to be loaded and executed during the boot process. These applications and drivers can employ the boot services and/or runtime services to perform a number of functions including accessing the Advanced Configuration and Power Interface (ACPI) framework.

UEFI facilitates the process of loading an operating system on a computing device. However, in many cases, the main operating system may fail to boot. For this reason, a service operating system may be provided on the computing device. In the event that the main operating systems fails to boot or crashes, the UEFI provides boot option recovery which allows the service operating system to be executed to attempt to identify and correct the cause of the failure. This service operating system may commonly be stored on a diagnostic partition of the computing device's hard drive or other storage.

In some cases, a computing device may have multiple main operating systems. In such cases, multiple service operating systems, one for each main operating system, may also be provided. This results in excessive consumption of storage. Additionally, when a main operating system fails on a computing device with multiple main operating systems, it can be difficult to identify which main operating system failed and therefore which service operating system should be executed.

BRIEF SUMMARY

The present invention extends to methods, systems, and computer program products for facilitating the identification and loading of an appropriate service operating system when a main operating system fails. To facilitate the identification of which main operating system failed, an agent can create a UEFI variable that is specific to each main operating system on a client. In the event that a main operating system fails to boot, the UEFI environment can be configured to execute a preboot application as part of boot option recovery. As part of this boot option recovery, the preboot application can update the UEFI variable specific to the main operating system that failed to boot to reflect the boot failure.

After updating the appropriate UEFI variable, the preboot application can instruct the UEFI environment to re-attempt the boot process. As part of this boot process, the preboot application will be executed and can access the OS-specific UEFI variables to determine if any main OS has failed to boot. Due to the update the preboot application made to the UEFI variable for the failed main operating system, the preboot application will be able to identify which main operating system failed.

Once the preboot application dentifies which main operating system failed, it can employ information contained in the UEFI variable for the failed main operating system to generate and send a service location protocol (SLP) request to a server. The preboot application can employ the SLP vendor extension to identify the failed main operating system. The server can then employ the content of the SLP vendor extension to locate and send the appropriate service operating system to the client. The preboot application can then cause the client to boot the downloaded service operating system which can perform appropriate diagnostics to attempt to recovery the failed main operating system.

In one embodiment, the present invention is implemented on a client as a method for facilitating the identification and loading of an appropriate service operating system when a main operating system fails. In response to a first main operating system failing to boot on the client, first UEFI variable that is specific to the first main operating system can be updated to indicate that the first main operating system failed to boot. Based on the first UEFI variable indicating that the first main operating system failed to boot, characteristics of the first main operating system can be obtained from the first UEFI variable. An SLP request can then be created and can include in a vendor extension the characteristics of the first main operating system that were obtained from the first UEFI variable. The SLP request can then be sent to a server. In response, a service operating system corresponding to the characteristics of the first main operating system that were included in the vendor extension can be received from the server. Finally, the client can be caused to boot the service operating system.

In another embodiment, the present invention is implemented on a client as a method for facilitating the identification and loading of an appropriate service operating system when a main operating system fails. In response to a first main operating system booting successfully on a client, a first UEFI variable that defines characteristics of the first main operating system can be created. In response to the first main operating system failing to boot on the client, the first UEFI variable can be updated to indicate that the first main operating system failed to boot. The first UEFI variable can then be accessed during a boot process. Based on the first UEFI variable indicating that the first main operating system failed to boot, an SLP request can be created. The SLP request can include a vendor extension that defines the characteristics of the first main operating system that are defined in the first UEFI variable. The SLP request can then be sent to a server. In response, a first service operating system that corresponds to the characteristics of the first main operating system that were defined in the vendor extension can be received and executed on the client.

In another embodiment, the present invention is implemented as computer storage media storing computer executable instructions which when executed implement a method for identifying and loading an appropriate service operating system when a main operating system fails. This method can comprise: in response to a first main operating system failing to boot on a client, creating and sending an SLP request to a server, the SLP request including a vendor extension that defines characteristics of the first main operating system; in response to receiving the SLP request at the server, accessing the characteristics of the first main operating system defined in the vendor extension; employing the characteristics of the first main operating system to identify, from among a plurality of service operating systems available on the server, a first service operating system that matches the characteristics of the first main operating system; sending the first service operating system to the client; and in response to receiving the first service operating system, causing the first service operating system to be executed on the client.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification and the claims, the term "main operating system" should be construed as an operating system that provides full functionality to enable a user to use a computing device (e.g., Windows, Ubuntu, RHEL, Suse, Mac, Android, etc.). The term "service operating system" should be construed as an operating system that performs diagnostic functions on a main operating system.

Figure 1:
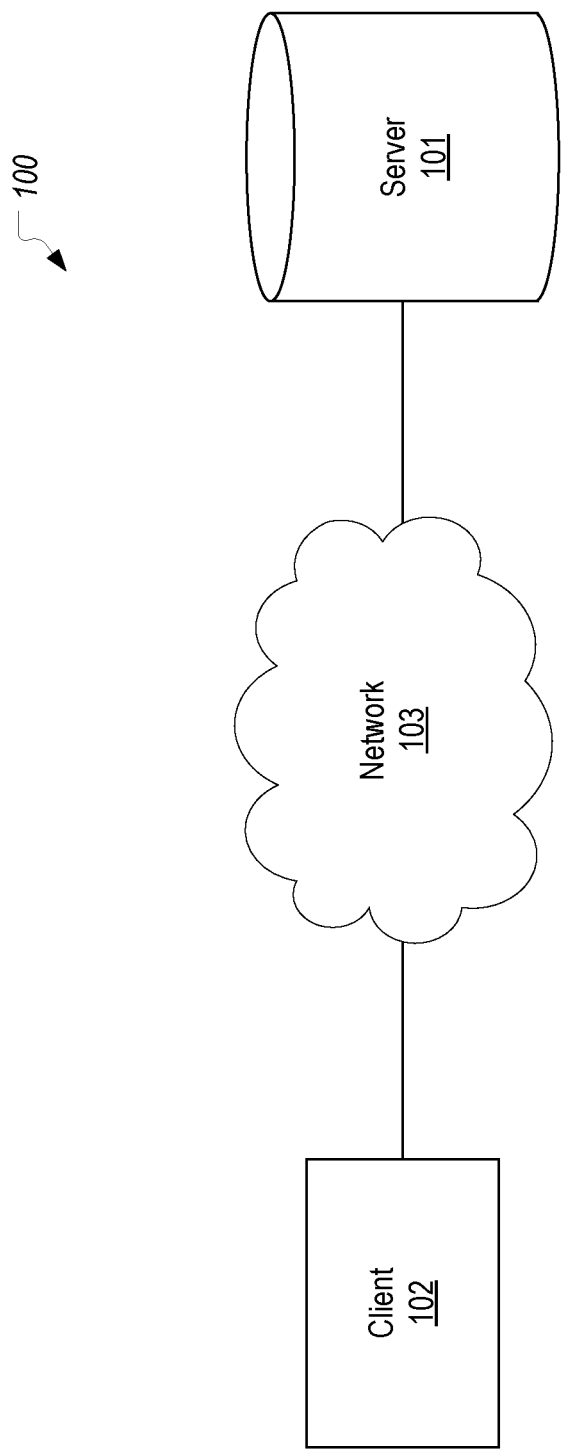
FIG. 1 illustrates an example computing environment in which the present invention can be implemented.

FIG. 1 illustrates a computing environment 100 in which the present invention can be implemented. Computing environment 100 includes a server 101 that is connected to a client 102 via a network 103. Server 101 can represent any computing architecture that can provide services to client 102 via network 103 such as a standalone computing device, a virtual machine or a cloud. Client 102 can represent any computing device that is capable of executing a main operating system and a service operating system. For example, client 102 could be a desktop computer, a laptop, a thin client, a mobile device, etc. Network 103 can represent any type of network architecture including a LAN environment and/or the internet.

Figure 2:
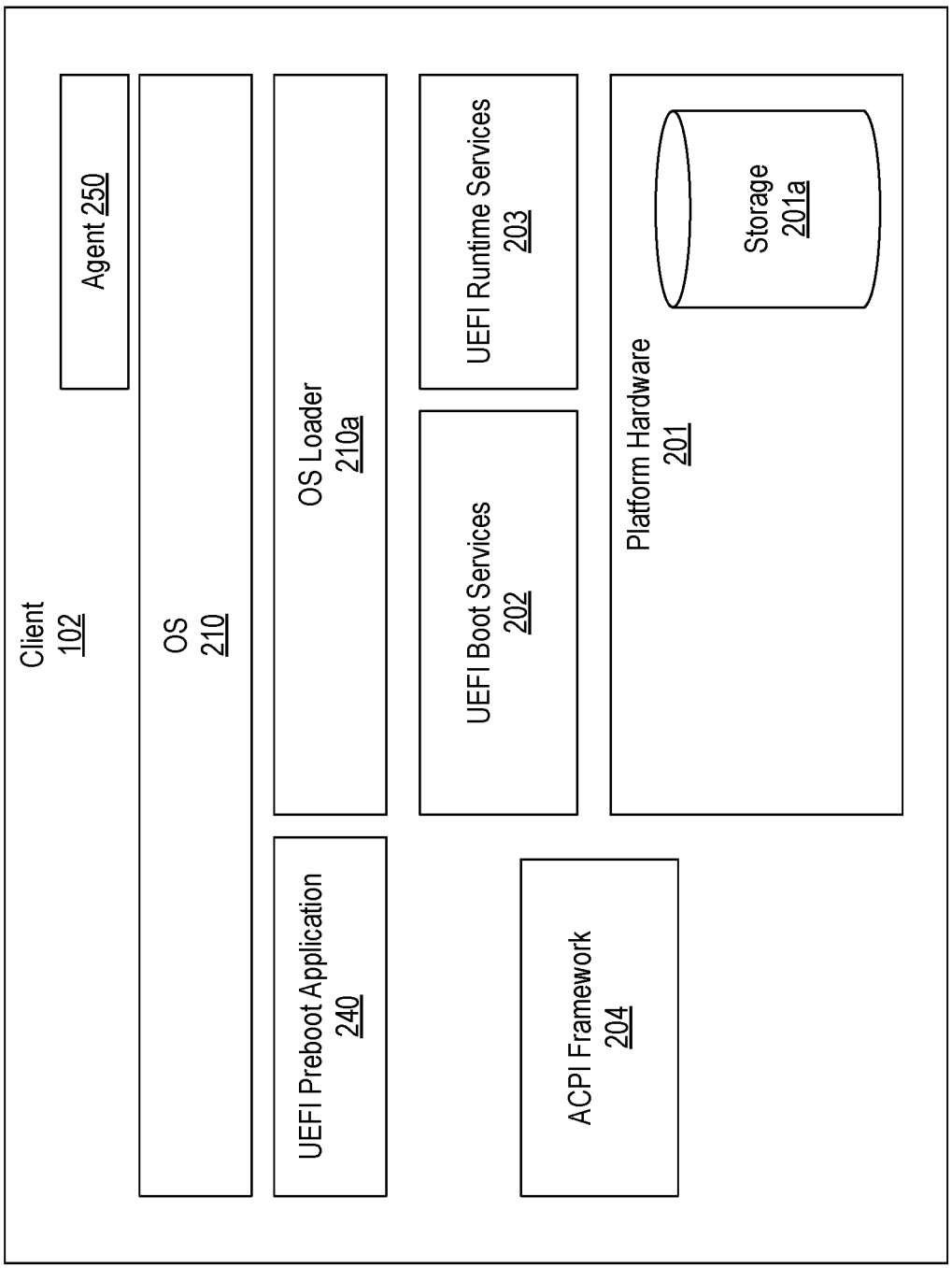
FIG. 2 illustrates client-side components that can be employed to implement the present invention.

FIG. 2 provides an overview of the components that may exist on client 102 to enable the present invention to be implemented. As addressed in the background, client 102 can conform to UEFI and will therefore provide access to platform hardware 201 via UEFI boot services 202 and UEFI runtime services 203. As shown, platform hardware 201 can include storage 201a which includes at least one UEFI system partition and may include a number of additional partitions for each operating system available on client 102. Client 102 can also conform to ACPI and will therefore provide ACPI framework 204. Client 102 is assumed to include an operating system loader 210a corresponding to operating system 210. Although not shown, client 102 may also include an operating system loader for any other operating systems on client 102.

In accordance with embodiments of the present invention, client 102 also includes a preboot application 240 which is a UEFI application. Client 102 also includes an agent 250 (e.g., a daemon) which can be configured to execute once operating system 210 has successfully booted. Although not shown, client 102 may include other instances of agent 250 that are specific to other operating systems that exist on client 102. As will be described in detail below, preboot application 240 and agent 250 can be configured to facilitate the identification and loading of an appropriate service operating system when a main operating system (e.g., operating system 210) fails to boot properly on client 102.

As an overview, to facilitate the identification of which main operating system failed, agent 250 can create a UEFI variable that is specific to each main operating system on client 102. In the event that a main operating system fails to boot, the UEFI environment can be configured to execute preboot application 240 as part of boot option recovery. As part of this boot option recovery, preboot application 240 can update the UEFI variable specific to the main operating system that failed to boot to reflect the boot failure. Preboot application 240 can then instruct the UEFI environment to re-attempt the boot process. As part of this boot process, preboot application 240 will be executed and can access the OS-specific UEFI variables to determine if any main OS has failed to boot. Due to the update the preboot application 240 made to the UEFI variable for the failed main operating system, preboot application 240 will be able to identify which main operating system failed.

Once preboot application 240 identifies which main operating system failed, it can employ information contained in the UEFI variable for the failed main operating system to generate and send a service location protocol (SLP) request to server 101. Preboot application 240 can employ the SLP vendor extension to identify the failed main operating system. Server 101 can then employ the content of the SLP vendor extension to locate and send the appropriate service operating system to client 102. Preboot application 240 can then cause client 102 to boot the downloaded service operating system which can perform appropriate diagnostics to attempt to recovery the failed main operating system.

Figure 3A:
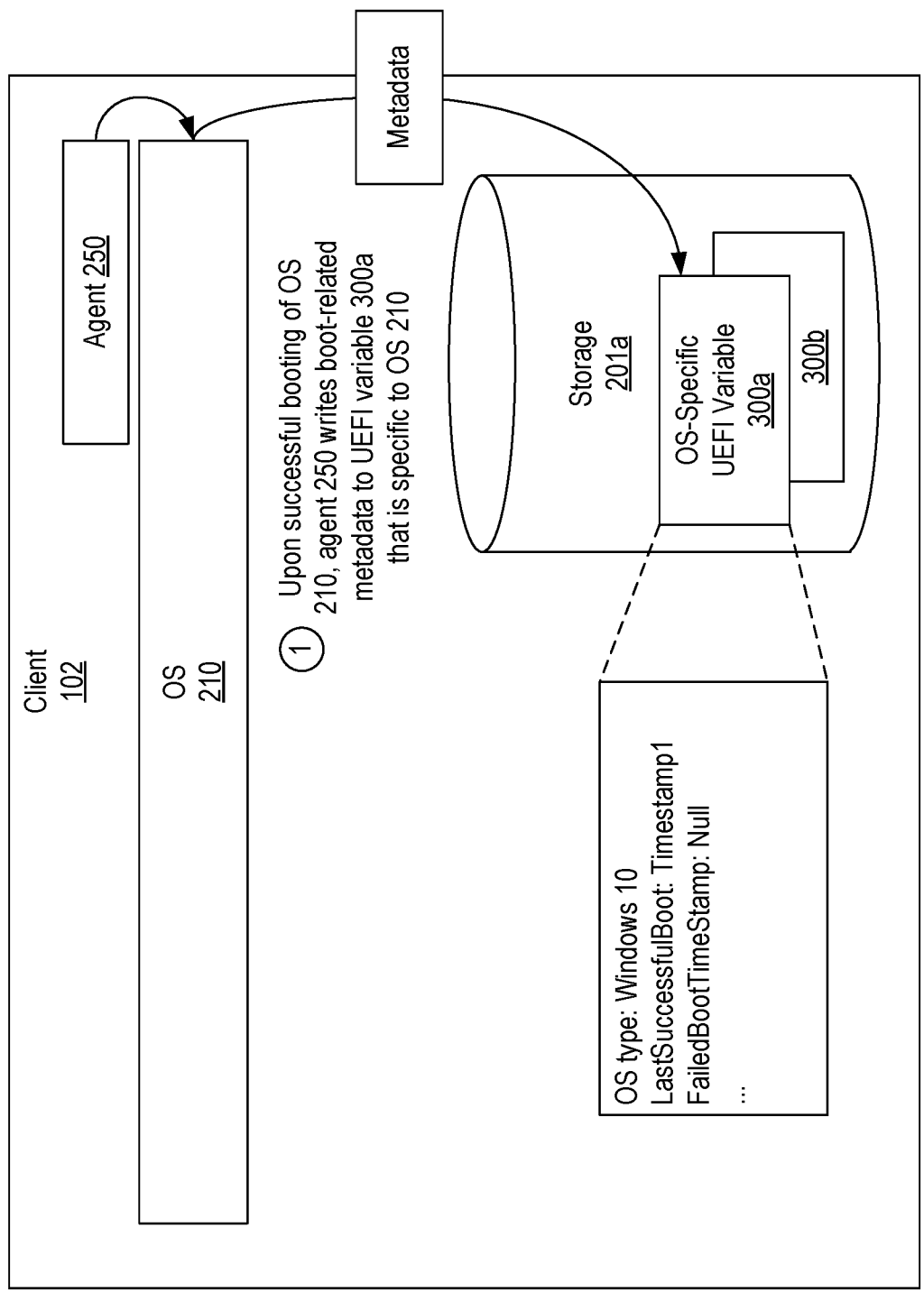
FIGS. 3A-3E illustrate how the present invention can facilitate identifying which main operating system failed to boot.

FIGS. 3A-3E illustrate how agent 250 and preboot application 240 facilitate the identification of a main operating system that has failed to boot. For ease of illustration, various components of the architecture shown in FIG. 2 have been omitted from these figures. In FIG. 3A, it is assumed that client 102 has successfully booted main operating system 210. As a result, agent 250 will be executed on client 102 and, in step 1, can write boot-related metadata to UEFI variable 300a that is specific to operating system 210 (e.g., via the SetFirmwareEnvironmentVariable function in Windows or via the efivarfs file system in Linux). It is also assumed that another operating system is installed on client 102 and that a UEFI variable 300b specific to the operating system has been created in storage 201a. Although not shown, client 102 may include additional operating systems for which OS-specific UEFI variables would exist. As generally represented in FIG. 3A, each OS-specific UEFI variable can identify characteristics (e.g., type, build, version, etc.) of operating system as well as information regarding the booting of the operating system. For example, OS-specific UEFI variable 300a indicates that operating system 210 is Windows 10, that the last successful booting of operating system 210 occurred at Timestamp1 and that operating system 210 has not failed to boot. As represented by the ellipsis, each OS-specific UEFI variable may include other information.

Figure 3B:
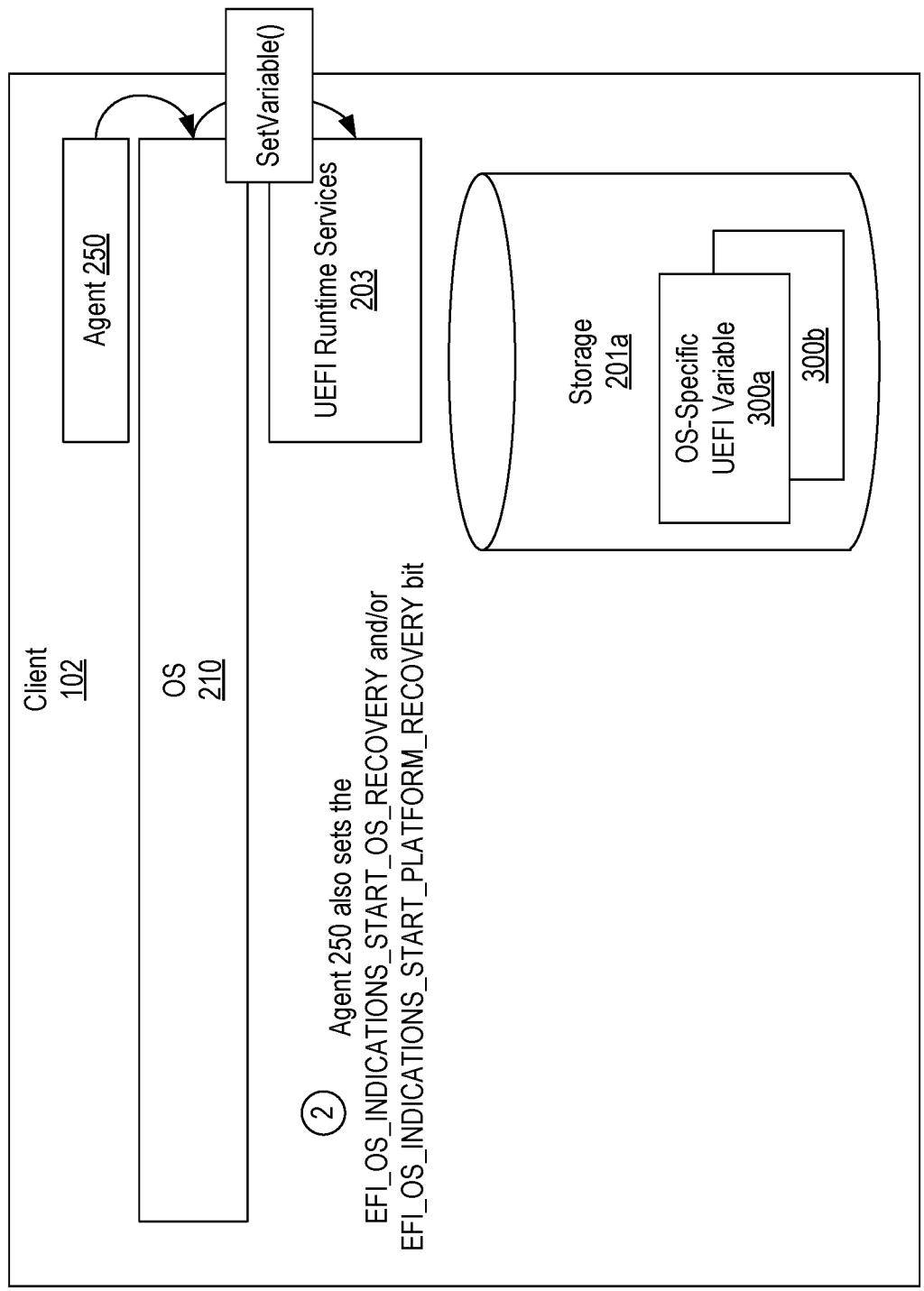

As represented as step 2 in FIG. 3B, in addition to creating OS-specific UEFI variables, agent 250 can also set the EFI_OS_INDICATIONS_START_OS_RECOVERY bit and/or the EFI_OS_INDICATIONS_START_PLATFORM_ RECOVERY bit of the OSIndications variable (e.g., by causing operating system 210 to invoke the SetVariable function that UEFI runtime services 203 provides). As is known, when the operating system has set the EFI_OS_INDICATIONS_START_OS_RECOVERY bit and booting fails, the UEFI platform will perform OS-defined recovery. As is also known, when the operating system has set the EFI_OS_INDICATIONS_START_PLATFORM_ RECOVERY bit and booting fails, the UEFI platform will perform platform-defined recovery (possibly after a failed attempt to perform OS-defined recovery). In other words, agent 250 can cause either or both of these bits to be set so that recovery will be performed if an operating system fails to boot.

Figure 3C:
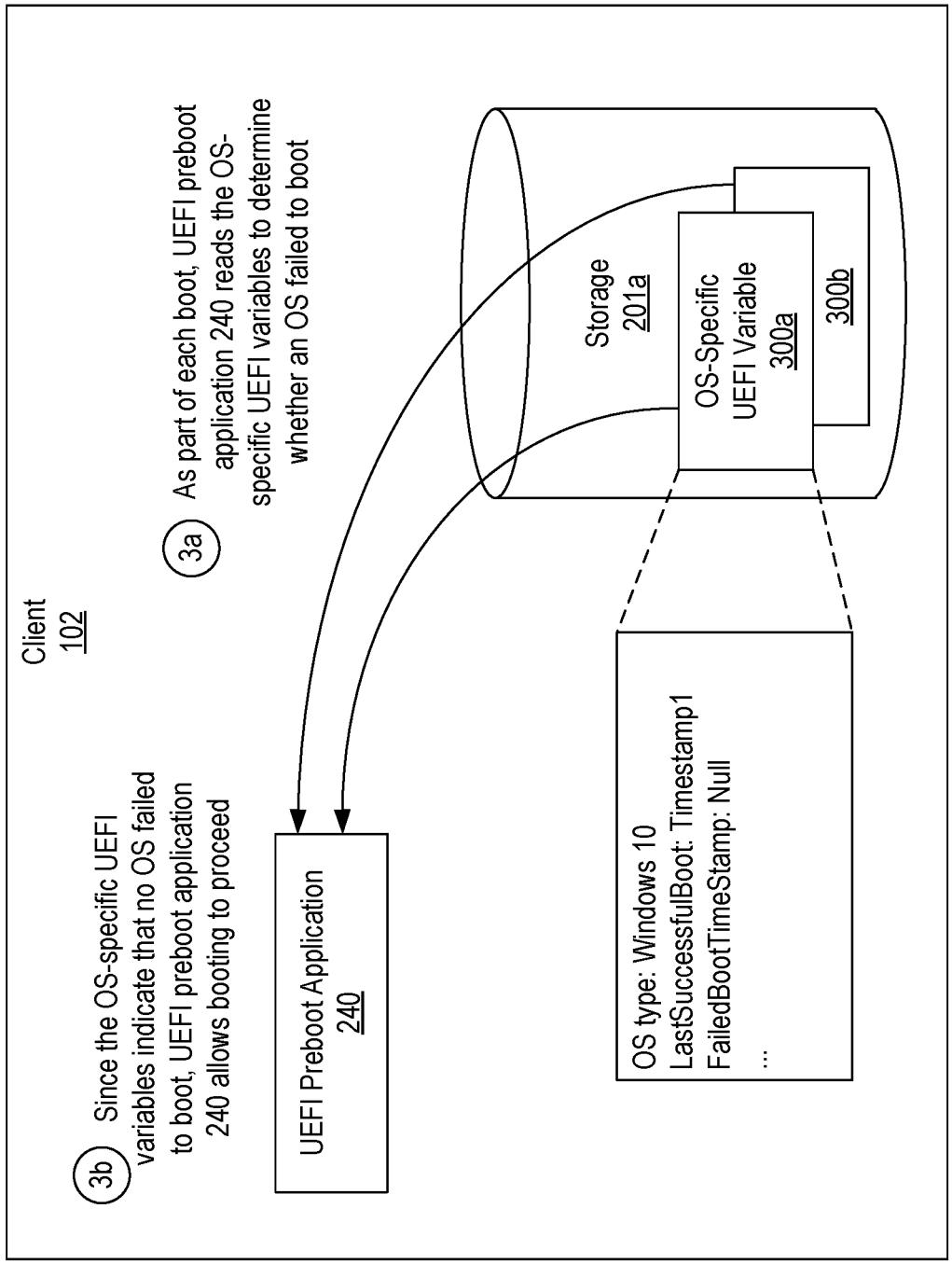

Turning to FIG. 3C, preboot application 240 can be configured to be loaded during each boot process. As represented in step 3a, when it is loaded, preboot application 240 can access each of the OS-specific UEFI variables to determine whether any main operating system has failed to boot. This can be accomplished by reading the value of the FailedBootTimeStamp in each OS-specific UEFI variable. For example, in OS-specific UEFI variable 300a, the FailedBootTimeStamp parameter is set to null indicating that operating system 210 has not failed to boot. In step 3b, and assuming none of the other OS-specific UEFI variables indicate that the corresponding main operating system has failed to boot, preboot application 240 can allow the boot process to proceed in a normal fashion (e.g., to boot operating system 210 or another main operating system).

Figure 3D:
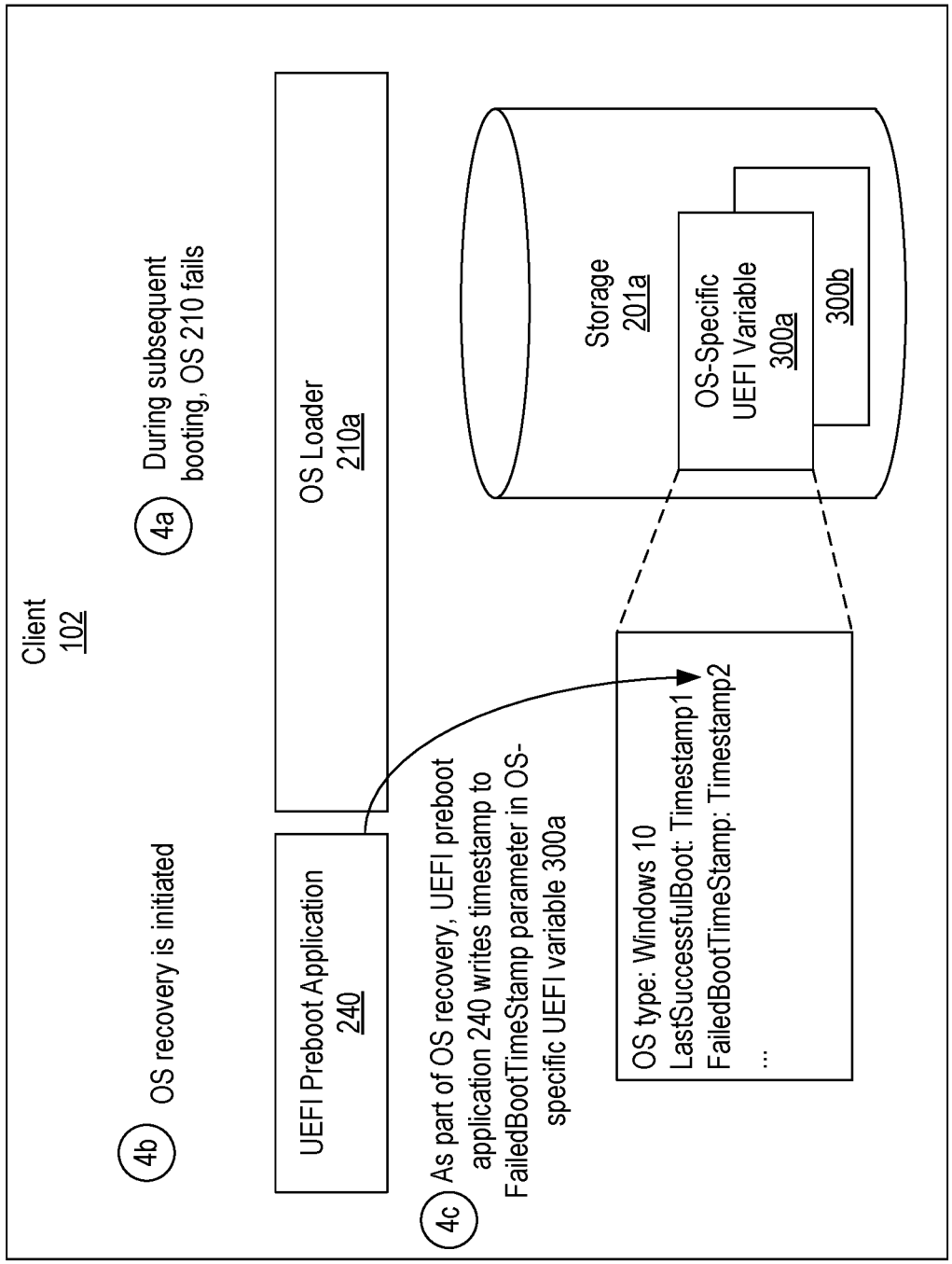

In FIG. 3D, it is assumed that operating system 210 fails to boot in step 4a. In step 4b, as a result of agent 250 causing the EFI_OS_INDICATIONS_START_OS_RECOVERY bit and/or EFI_OS_INDICATIONS_START_PLATFORM_ RECOVERY bit to be set, the UEFI platform will initiate boot operation recovery. The UEFI platform can be configured to load preboot application 240 as part of the boot operation recovery (e.g., by using the OsRecoveryOrder variable). Accordingly, in step 4c, preboot application 240, once loaded, can access OS-specific UEFI variable 300a (given that operating system 210 has failed to load) and set the FailedBootTimeStamp parameter accordingly (e.g., by writing a timestamp, Timestamp2, defining when the failed boot occurred). At this point, preboot application 240 can return control to the UEFI boot manager (e.g., by calling EFI_BOOT_SERVICES.ExitBootServices( ) or ResetSystem( )) which will cause the boot manager to re-attempt the boot process.

Figure 3E:
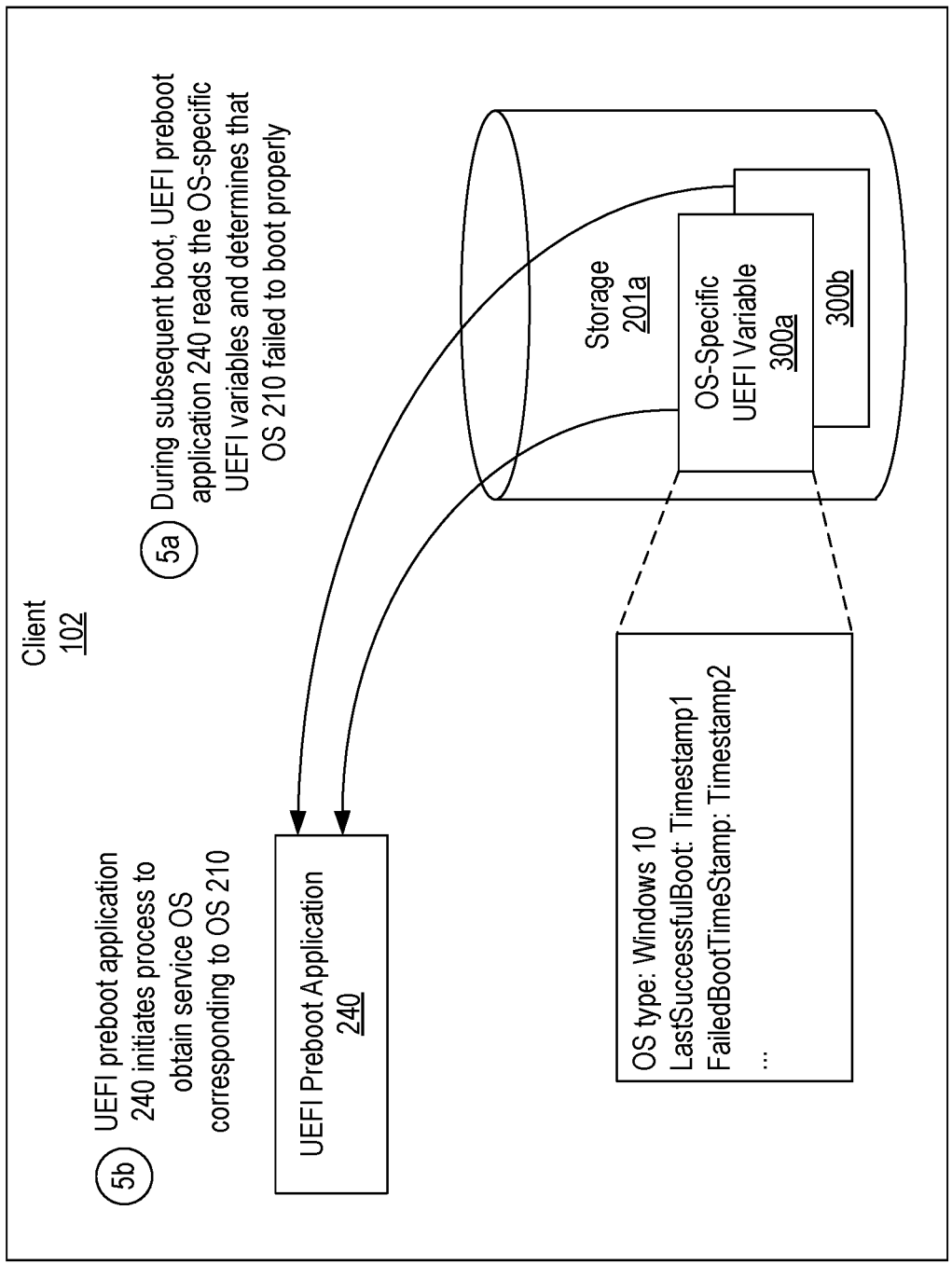

Turning to FIG. 3E, during the subsequent attempt to boot client 102, preboot application 240 will again be loaded. In step 5a, similar to step 3a, preboot application 240 will access each OS-specific UEFI variable to determine if any main operating system failed to boot. In this instance, because the FailedBootTimeStamp parameter of OS-specific UEFI variable 300a is set to a valid timestamp, in step 5b, preboot application 240 will initiate the process of obtaining and booting a service operating system corresponding to main operating system 210. In particular, because the FailedBootTimeStamp parameter in OS-specific UEFI variable 300a is set, preboot application 240 can determine, from the OS type parameter, that the Windows 10 operating system has failed to boot (as opposed to the operating system defined in OS-specific UEFI variable 300b or another OS-specific UEFI variable).

Figure 4A:
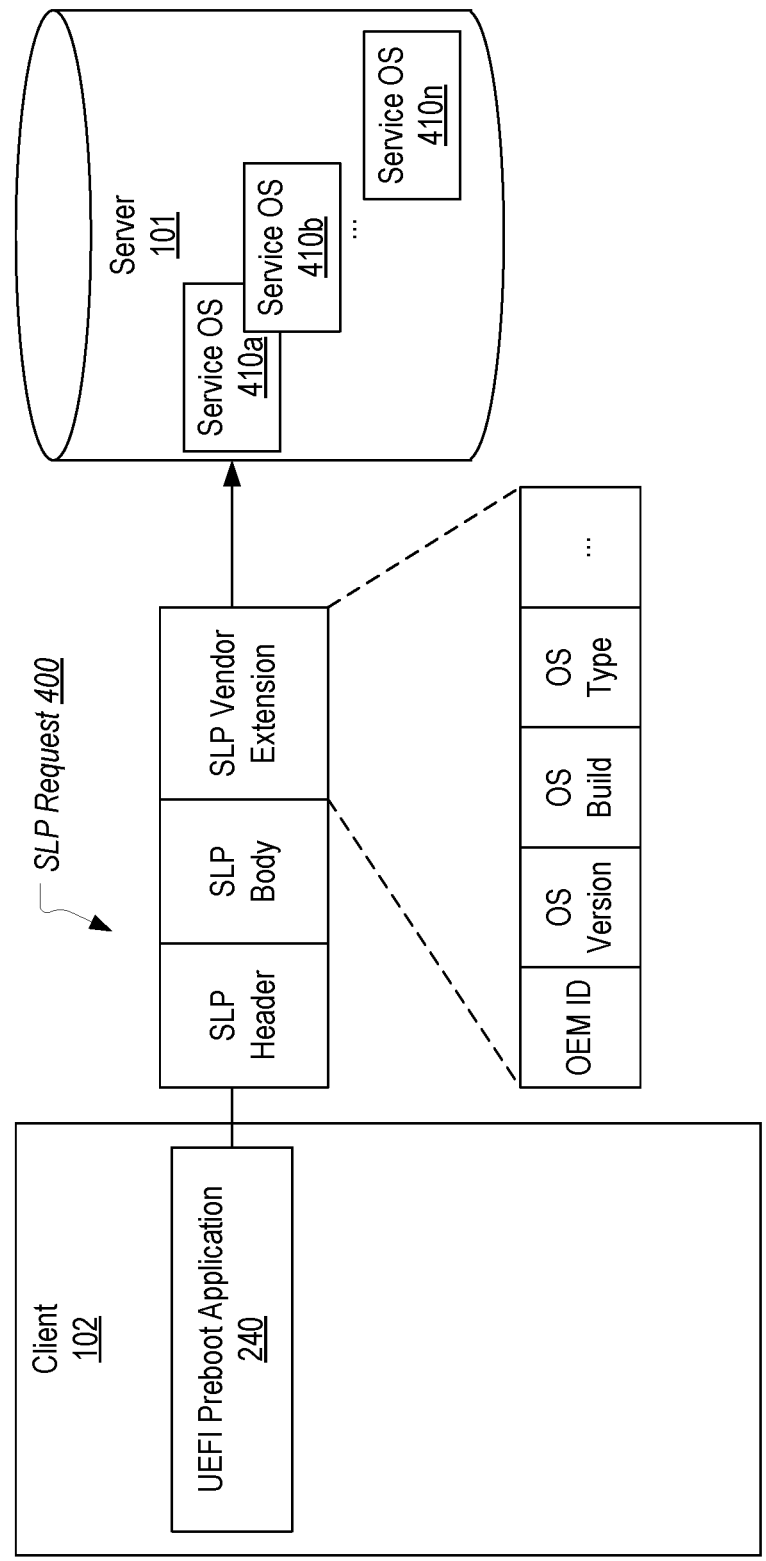
FIGS. 4A-4C illustrate how the present invention can retrieve and execute a service operating system corresponding to the failed main operating system.
Figure 4B:
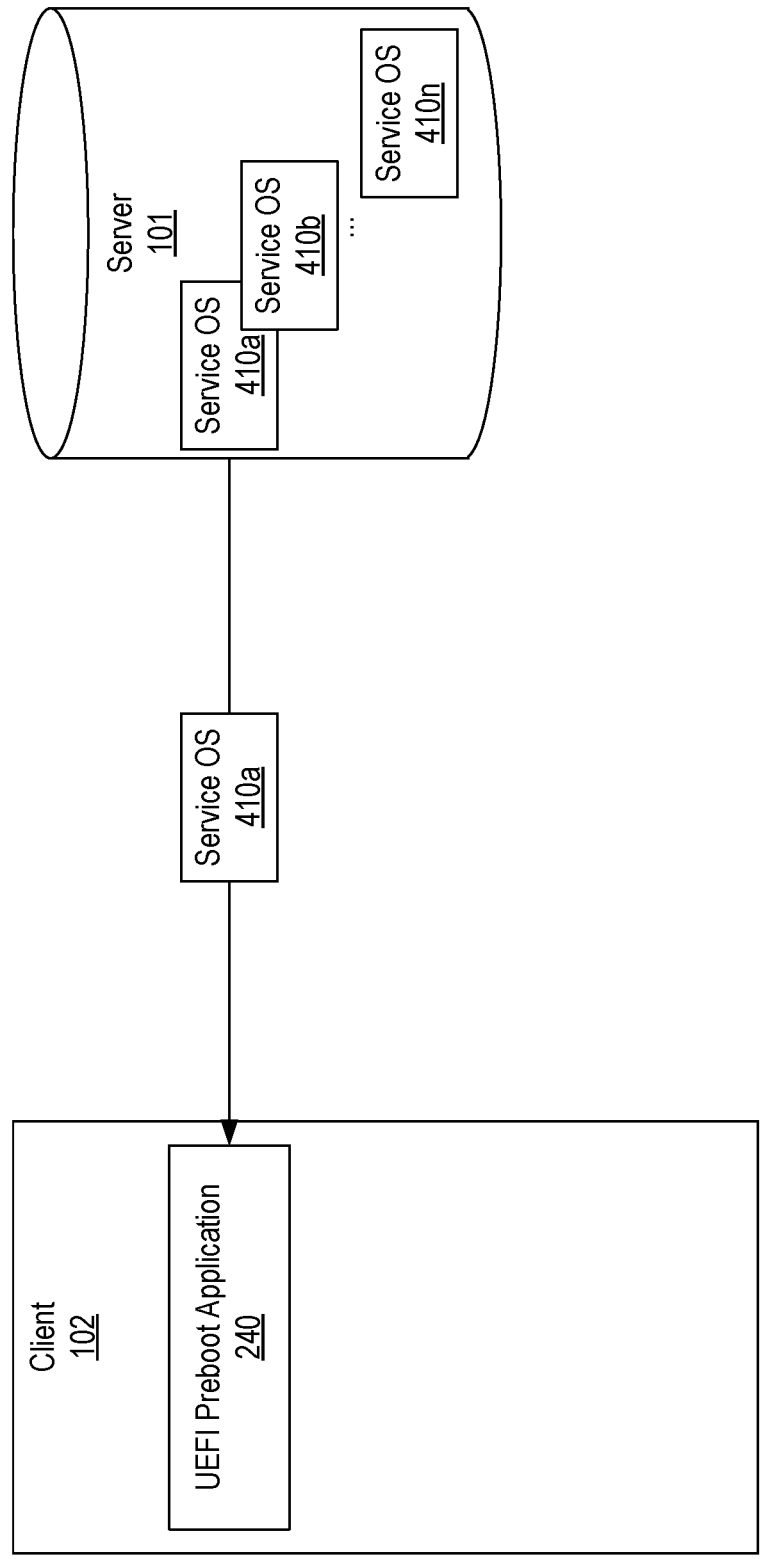
Figure 4C:
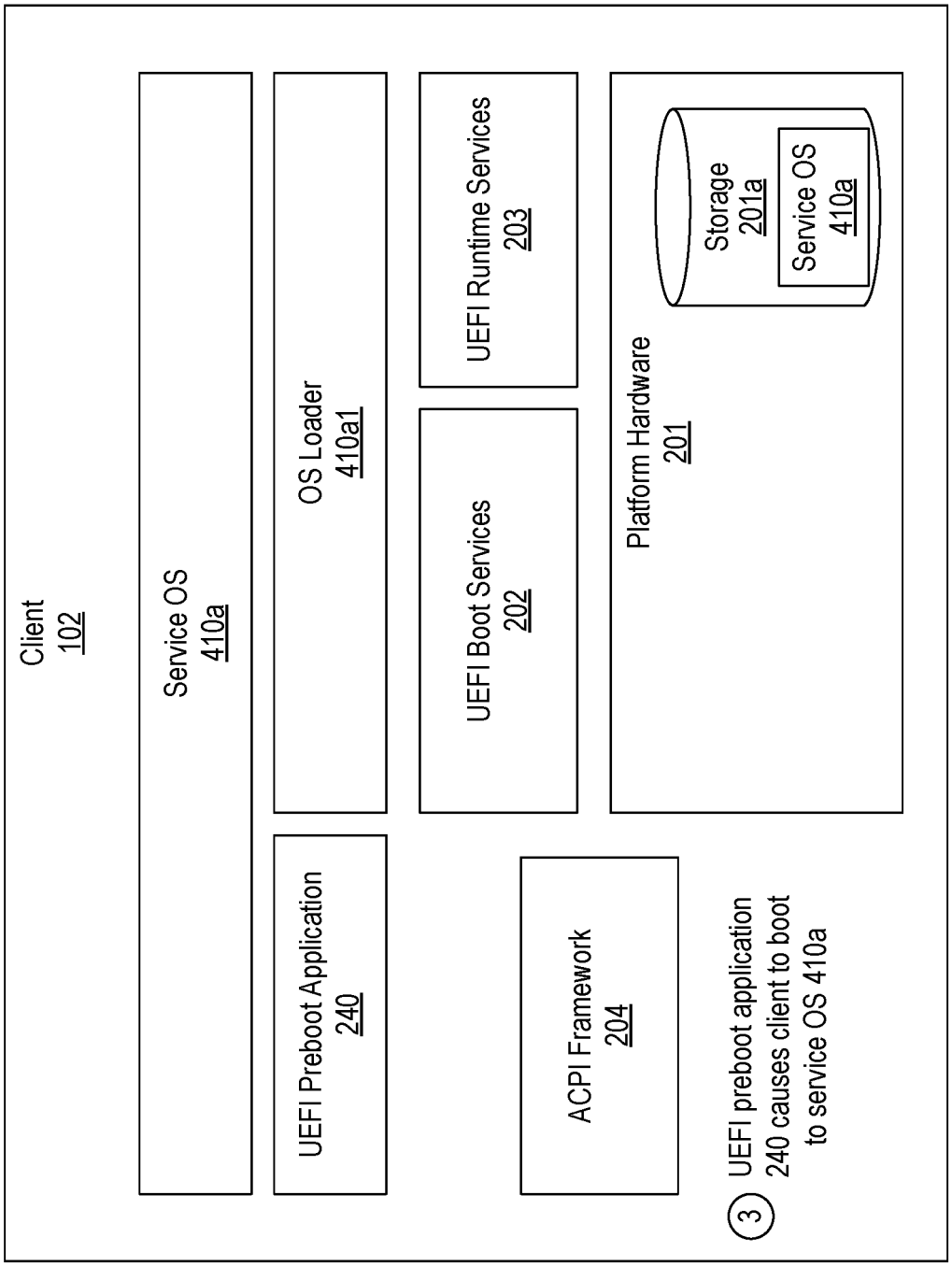

FIGS. 4A-4C illustrate various steps that preboot application 240 can perform after identifying which main operating system has failed to obtain a service operating system specific to the failed main operating system from server 101. In step 1 shown in FIG. 4A, preboot application 240 can create and send an SLP request to server 101. In order to specify to server 101 which main operating system has failed, preboot application 240 can create an SLP vendor extension that defines the characteristics of the failed main operating system. For example, as shown in FIG. 4A, preboot application 240 can create and send SLP request 400 that includes an SLP vendor extension that defines an OEM ID (e.g., 0x8010), an OS version (e.g., 1803), an OS build (e.g., 17134.472), an OS type (e.g., Windows 10) and possibly other characteristics. Preboot application 240 can obtain the OS version, build and type from OS-specific UEFI variable 300a. The OEM ID can be a constant value that server 101 has been configured to understand as representing requests for service operating systems.

Server 101 processes SLP request 400 to determine which service operating system should be sent to client 102. As shown, server 101 can maintain a number of service operating systems 410a-410n corresponding to the various main operating systems that may be installed on any client 102 that server 101 manages. In this example, it will be assumed that service operating system 410a corresponds to the Windows 10 operating system that failed to boot on client 102. Accordingly, by evaluating the characteristics defined in the SLP vendor extension of SLP request 400, server 101 can determine that service operating system 410a should be sent to client 102 and can then send service operating system 410a in step 2. Preboot application 240 can store service operating system 410a in an appropriate location in storage 201a (e.g., in RAMDisk).

Finally, in step 3 shown in FIG. 4C, preboot application 240 can cause the UEFI platform to boot service operating system 410a. As a result, service operating system 410a will be executed on client 102 and can perform any appropriate diagnostics to identify and address any reason for the failure of main operating system 210. Although not shown, preboot application 240 and/or service operating system 410a can also reset the FailedBootTimeStamp parameter in OS-specific UEFI variable 300a so that, during a subsequent boot, preboot application 240 will not again attempt to retrieve and execute a service operating system.

The above-described process can also be implemented using an ACPI table rather than OS-specific UEFI variables. For example, agent 250 can be configured to create/update an ACPI table to include OS-specific entries that define the same type of information as the OS-specific UEFI variables. Therefore, for purposes of this description and the claims, the term "UEFI variable" should be construed as encompassing entries in an ACPI table. In embodiments where an ACPI table is employed, preboot application 240 can be configured to access the ACPI table during boot option recovery to determine which main operating system has failed and to obtain the characteristics of the failed main operating system to be included in the SLP request.

Figure 5:
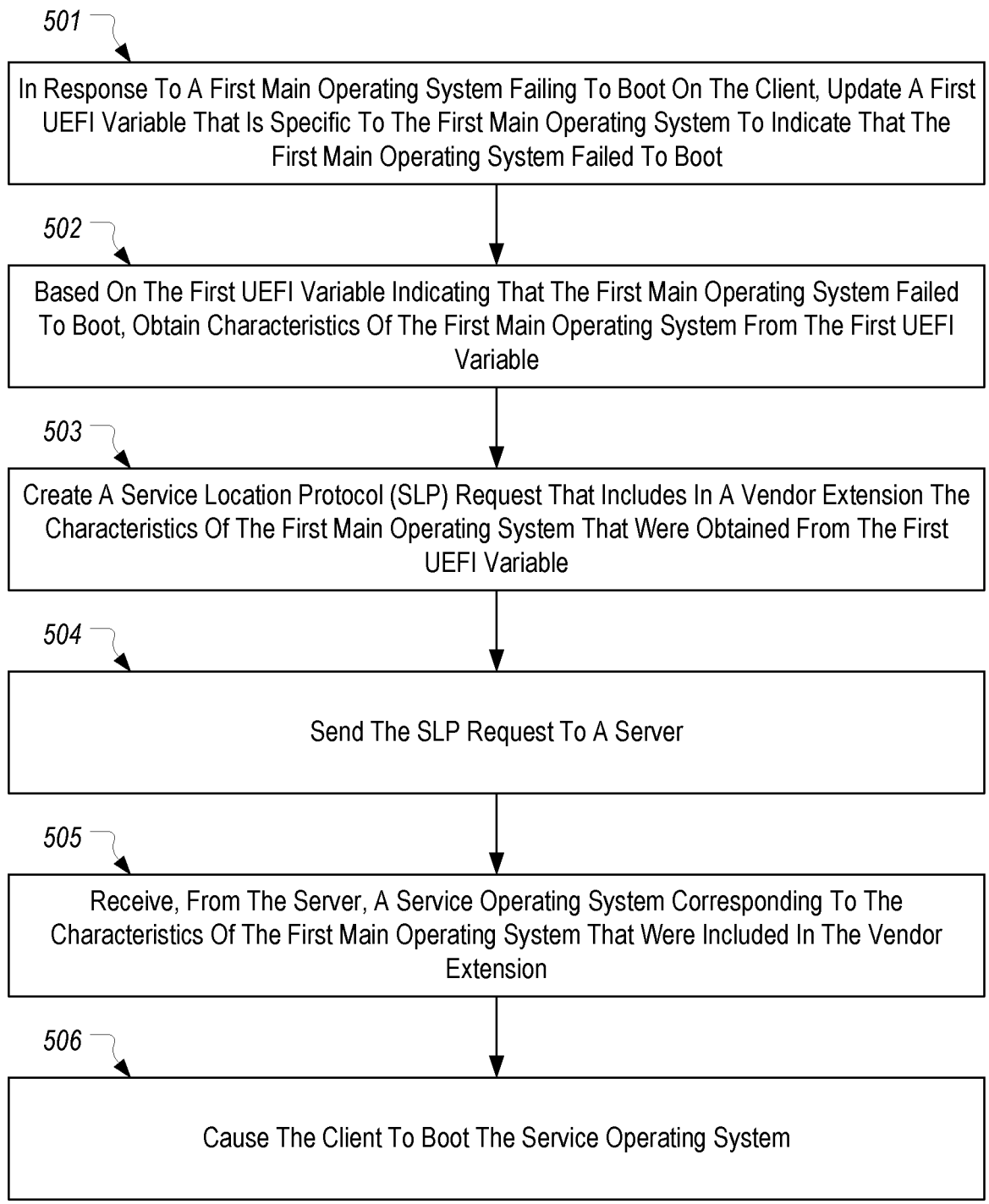
FIG. 5 illustrates a flowchart of an example method for facilitating the identification and loading of an appropriate service operating system when a main operating system fails.

FIG. 5 provides a flowchart of an example method 500 for facilitating the identification and loading of an appropriate service operating system when a main operating system fails. Method 500 can be implemented on client 102.

Method 500 includes an act 501 of, in response to a first main operating system failing to boot on the client, updating a first UEFI variable that is specific to the first main operating system to indicate that the first main operating system failed to boot. For example, preboot application 240 can update the FailedBootTimeStamp parameter of OS-specific UEFI variable 300a when operating system 210 fails to boot.

Method 500 includes an act 502 of, based on the first UEFI variable indicating that the first main operating system failed to boot, obtaining characteristics of the first main operating system from the first UEFI variable. For example, preboot application 240 can obtain an operating system type, version, and/or build from OS-specific UEFI variable 300a.

Method 500 includes an act 503 of creating an SLP request that includes in a vendor extension the characteristics of the first main operating system that were obtained from the first UEFI variable. For example, preboot application 240 can create SLP request 400 and include characteristics of operating system 210 in a vendor extension.

Method 500 includes an act 504 of sending the SLP request to a server. For example, preboot application 240 can cause SLP request 400 to be sent to server 101.

Method 500 includes an act 505 of receiving, from the server, a service operating system corresponding to the characteristics of the first main operating system that were included in the vendor extension. For example, preboot application 240 can download service operating system 410a from server 101.

Method 500 includes an act 506 of causing the client to boot the service operating system. For example, preboot application 240 can cause the UEFI environment to boot service operating system 410a on client 102.

In summary, the techniques of the present invention provide a way to facilitate the identification and retrieval of a service operating system for a particular main operating system that has failed to boot. The present invention eliminates the need to store each service operating system on the client thereby freeing up storage that oftentimes is limited. The present invention also provides a dynamic way of identifying which main operating system has failed thereby reducing the amount of administrator intervention that may otherwise be required to address operating system failures. For these reasons, the present invention is particularly beneficial when clients have multiple main operating systems. However, the present invention can be implemented on clients that have a single main operating system.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for facilitating the identification and loading of an appropriate service operating system when a main operating system fails, the method comprising:
   in response to a first main operating system failing to boot on the client, updating a first Unified Extensible Firmware Interface (UEFI) variable that is specific to the first main operating system to indicate that the first main operating system failed to boot;
   based on the first UEFI variable indicating that the first main operating system failed to boot, obtaining characteristics of the first main operating system from the first UEFI variable;
   creating a service location protocol (SLP) request that includes in a vendor extension the characteristics of the first main operating system that were obtained from the first UEFI variable;

sending the SLP request to a server;
receiving, from the server, a service operating system corresponding to the characteristics of the first main operating system that were included in the vendor extension; and
causing the client to boot the service operating system.

2. The method of claim 1, wherein the first UEFI variable is updated by a UEFI preboot application.

3. The method of claim 1, further comprising:
in response to the first main operating system booting successfully, creating the first UEFI variable and storing the characteristics of the first main operating system in the first UEFI variable.

4. The method of claim 3, further comprising:
in response to the first main operating system booting successfully, configuring a UEFI platform on the client to perform boot option recovery when a main operating system fails to boot.

5. The method of claim 1, wherein the characteristics of the first main operating system comprise one or more of a type of the first main operating system, a version of the first main operating system or a build of the first main operating system.

6. The method of claim 1, wherein the first main operating system is one of a plurality of main operating systems installed on the client.

7. The method of claim 1, wherein the first UEFI variable is part of an advanced configuration and power interface (ACPI) table.

8. The method of claim 1, wherein updating the first UEFI variable to indicate that the first main operating system failed to boot comprises writing a timestamp that identifies when the failure to boot occurred.

9. The method of claim 1, further comprising:
receiving, by the server, the SLP request;
extracting the characteristics of the first main operating system from the vendor extension;
employing the characteristics of the first main operating system to identify the first service operating system from among a plurality of service operating systems; and
sending the first service operating system to the client.

10. A method for facilitating the identification and loading of an appropriate service operating system when a main operating system fails, the method comprising:
in response to a first main operating system booting successfully on a client, creating a first UEFI variable that defines characteristics of the first main operating system;
in response to the first main operating system failing to boot on the client, updating the first UEFI variable to indicate that the first main operating system failed to boot;
accessing the first UEFI variable during a boot process;
based on the first UEFI variable indicating that the first main operating system failed to boot, creating an SLP request that includes a vendor extension that defines the characteristics of the first main operating system that are defined in the first UEFI variable;
sending the SLP request to a server;
receiving, from the server, a first service operating system that corresponds to the characteristics of the first main operating system that were defined in the vendor extension; and
causing the first service operating system to be executed on the client.

11. The method of claim 10, further comprising:
in response to a second main operating system booting successfully on the client, creating a second UEFI variable that defines characteristics of the second main operating system.

12. The method of claim 11, wherein the first and second UEFI variables are part of an ACPI table.

13. The method of claim 11, further comprising:
in response to the second main operating system failing to boot on the client, updating the second UEFI variable to indicate that the second main operating system failed to boot;
accessing the first and second UEFI variables during a boot process;
based on the second UEFI variable indicating that the second main operating system failed to boot, creating a second SLP request that includes a vendor extension that defines the characteristics of the second main operating system that are defined in the second UEFI variable;
sending the second SLP request to the server;
receiving, from the server, a second service operating system that corresponds to the characteristics of the second main operating system that were defined in the vendor extension of the second SLP request; and
causing the second service operating system to be executed on the client.

14. The method of claim 10, wherein the characteristics of the first main operating system includes one or more of a type, version or build of the first main operating system.

15. The method of claim 10, further comprising:
after updating the first UEFI variable to indicate that the first main operating system failed to boot, causing the client to perform the boot process.

16. The method of claim 10, wherein an agent that executes on the first main operating system creates the first UEFI variable, and a UEFI preboot application updates the first UEFI variable to indicate that the first main operating system failed to boot.

17. One or more computer storage media storing computer executable instructions which when executed implement a method for identifying and loading an appropriate service operating system when a main operating system fails, the method comprising:
in response to a first main operating system failing to boot on a client, creating and sending an SLP request to a server, the SLP request including a vendor extension that defines characteristics of the first main operating system;
in response to receiving the SLP request at the server, accessing the characteristics of the first main operating system defined in the vendor extension;
employing the characteristics of the first main operating system to identify, from among a plurality of service operating systems available on the server, a first service operating system that matches the characteristics of the first main operating system;
sending the first service operating system to the client; and
in response to receiving the first service operating system, causing the first service operating system to be executed on the client.

18. The computer storage media of claim 17, wherein the method further comprises:
creating a first UEFI variable on the client that defines the characteristics of the first main operating system;

wherein the characteristics of the first main operating system defined in the vendor extension are obtained from the first UEFI variable.

19. The computer storage media of claim 18, wherein the method further comprises:

determining that the first main operating system has failed to boot by accessing the first UEFI variable.

20. The computer storage media of claim 19, wherein, in response to the first main operating system failing to boot, the first UEFI variable is updated to indicate that the failure occurred.

\* \* \* \* \*